United States Patent
Cohen et al.

(10) Patent No.: US 8,411,610 B2
(45) Date of Patent: Apr. 2, 2013

(54) METHOD FOR TRANSMITTING MULTI UNICAST INFORMATION WITHIN BROADCASTED INFORMATION

(75) Inventors: Daniel Cohen, Ra'anana (IL); Yaniv Weizmann, Petach Tikva (IL)

(73) Assignee: SparkMotion Inc., Ottawa (CA)

( * ) Notice: Subject to any disclaimer, the term of this patent is extended or adjusted under 35 U.S.C. 154(b) by 204 days.

(21) Appl. No.: 12/777,488

(22) Filed: May 11, 2010

(65) Prior Publication Data
US 2011/0280172 A1 Nov. 17, 2011

(51) Int. Cl.
*H04H 20/71* (2008.01)
(52) U.S. Cl. .......................................... 370/312
(58) Field of Classification Search ............ 370/203, 370/204–215, 229–240, 310–337, 338–350, 370/351–394, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 5,903,559 A | * | 5/1999 | Acharya et al. | 370/355 |
| 5,930,259 A | * | 7/1999 | Katsube et al. | 370/409 |
| 7,912,134 B2 | * | 3/2011 | Rengarajan et al. | 375/259 |
| 7,986,662 B2 | * | 7/2011 | Jang et al. | 370/329 |
| 8,064,392 B2 | * | 11/2011 | Chang et al. | 370/329 |
| 8,102,802 B2 | * | 1/2012 | Ratasuk et al. | 370/329 |
| 2003/0063287 A1 | * | 4/2003 | Marcus et al. | 356/497 |
| 2003/0063587 A1 | * | 4/2003 | Cho et al. | 370/335 |
| 2007/0206561 A1 | * | 9/2007 | Son et al. | 370/346 |
| 2009/0040970 A1 | * | 2/2009 | Ahmadi et al. | 370/329 |
| 2010/0008326 A1 | * | 1/2010 | Albanese et al. | 370/331 |
| 2010/0254332 A1 | * | 10/2010 | Cho et al. | 370/329 |
| 2011/0194419 A1 | * | 8/2011 | Lee et al. | 370/242 |

FOREIGN PATENT DOCUMENTS

WO 2009112928 9/2009

* cited by examiner

*Primary Examiner* — Kwang B Yao
(74) *Attorney, Agent, or Firm* — Procopio, Cory, Hargreaves & Savitch LLP

(57) ABSTRACT

A method and apparatus are provided for transmitting a communication frame by a base station which comprises broadcasted information intended for a plurality of subscriber stations (AMSs), wherein that information is broadcasted by using more than one Modulation and Coding Scheme (MCS). The method comprises the steps of: a) receiving bandwidth requests' indications from the plurality of AMSs; b) based on these indications, identifying more than one decoding capabilities, wherein each of the identified decoding capabilities is associated with at least one of the plurality of AMSs; c) preparing a Bandwidth Request Acknowledgement Media Access Protocol Information Element (BR-ACK MAP-IE) message in response to the bandwidth requests' indications received; and d) transmitting a communication frame which comprises at least two copies of the BR-ACK MAP-IE message, wherein the number of the copies corresponds to the number of different decoding capabilities identified, and wherein each of the copies is transmitted at an MCS that corresponds to a respective decoding capability that has been identified.

11 Claims, 2 Drawing Sheets

METHOD FOR TRANSMITTING MULTI UNICAST INFORMATION WITHIN BROADCASTED INFORMATION

FIELD OF THE INVENTION

The present invention belongs to the field of cellular communication and particularly to the field of transmission of messages in the IEEE 802.16 m standard.

BACKGROUND OF THE INVENTION

As of October 2009, over 500 WiMAX (fixed and mobile) networks have been deployed in over 145 countries. The WiMAX (Worldwide Interoperability for Microwave Access) technology is one that is based on the IEEE 802.16 Standard which keeps evolving as the demand for high speed data services for mobile users, increases. As a result, many of the deployed networks are being upgraded to cater this demand. For example, networks that are based on one of the early technologies utilizing IEEE 802.16e Standard, known as Mobile-WiMax, are being upgraded to comply with IEEE 802.16 m Standard. The Base Stations in the upgraded or enhanced networks are known as Advanced Base Stations (ABSs) that are capable of supporting both IEEE 802.16e Standard based traffic as well as IEEE 802.16 m Standard based traffic, while upgraded Mobile Subscribers are accordingly known as Advanced Mobile Subscribers (AMSs).

In the IEEE 802.16 m framework there are certain broadcast messages named as Advanced MAP Information Elements (A-MAP IEs) that contain aggregated multi unicast information addressed for one or multiple users. In order to efficiently provide control information WO 09112928 teaches the use of a broadcast pointer channel (BPCH) to identify the type and perhaps relative location of control information that is being provided in a given frame structure, such as a sub-frame, frame, or superframe. A sub-frame has a BPCH and a corresponding system control information segment in which control information resides. The system control information segment has a number of control information blocks, wherein each control information block that is present corresponds to a particular type of control information. The BPCH is used to identify the type of control information that is present in a corresponding system control information segment, and if needed or desired, the relative locations of the various control information.

Another example of such broadcast messages that contain aggregated multi unicast information for multiple users, is the BR-ACK MAP-IE message that is used when the ABS receives Bandwidth Request (BR) sequences sent by one or more AMSs. The ABS then sends the BR-ACK A-MAP IE in the next frame, containing acknowledgment and optionally bandwidth grants for the requesting AMSs. In spite of the advantages associated with this technique of sending aggregated multi unicast information in broadcast messages, it also has some drawbacks, for example the inefficiency caused by the fact the message should be sent at the lowest Modulation and Coding Scheme (MCS) that is expected to be decoded by all addressed users. When broadcasting a single A-MAP IE message with aggregated multi unicast information to multiple users (in our example, to acknowledge the BRs received from multiple users), it is found to a rather wasteful process and may lead to significant A-MAP controlling overhead.

The present invention seeks to provide an efficient solution for the problem of broadcasting aggregated multi unicast information to multiple users having different MCS capabilities.

SUMMARY OF THE INVENTION

It is an object of the present invention to provide a method for broadcasting aggregated multi unicast information to multiple users having different MCS capabilities.

It is another object of the present invention to provide a method for broadcasting aggregated multi unicast information in a plurality of A-MAP IEs.

It is yet another object of the present invention to reduce the aggregate size of BR-ACK A-MAP IE messages, thus enabling increased transmission efficiency with reduced A-MAP controlling overhead.

It is still another object of the present invention to provide a method for redefining the BR mechanism and A-MAP IE format in the 802.16m Standard to allow the ABS to send BR acknowledgments and possibly grants in more than one A-MAP IE.

Other objects of the invention will become apparent as the description of the invention proceeds.

According to a first embodiment of the present invention, there is provided a method for use in a wireless network that comprises at least one Advanced Base Station (ABS) adapted to communicate with a first plurality of Advanced Mobile Stations (AMSs). The method is adapted for transmitting a communication frame which comprises broadcasted information intended for a second plurality of AMSs, wherein the information is broadcasted by using more than one Modulation and Coding Scheme (MCS). The method comprises the steps of:

a. at the ABS, receiving indications of bandwidth requests, generated by the second plurality of AMSs belonging to the first plurality of AMSs;

b. identifying more than one decoding capabilities, wherein each of the identified decoding capabilities is associated with at least one AMS belonging to the second plurality of AMSs;

c. preparing one or more Bandwidth Request Acknowledgement MAP Information Element (BR-ACK MAP-IE) messages in response to the bandwidth requests' indications received; and d. transmitting towards the second plurality of AMSs, a communication frame which comprises at least two copies of the BR-ACK MAP-IE message, wherein the number of the at least two copies corresponds to the number of different decoding capabilities identified, and wherein each of the at least two copies is transmitted at an MCS that corresponds to a respective decoding capability that has been identified. However, it should be appreciated by those skilled in the art that one BR-ACK MAP-IE message may be transmitted even though there are AMSs having different encoding capabilities due to the load created by BR-ACK MAP-IE message's header overheads.

As will be appreciated by those skilled in the art, typically the number of the AMSs belonging to the second plurality of AMSs is less than the number of the AMSs belonging to the first plurality of AMSs, as it is rather rare to encounter a situation where all of the AMSs associated with a ABS will transmit within a very short period of time (e.g. 10 msec) a bandwidth request. Also, although according to step d. above the transmitting is carried out towards the second plurality of AMSs, still this step should be understood to encompass cases where further AMSs (other than those included in the second plurality of AMSs) may receive that communication frame, but the information would still relate to the AMSs belonging to the second plurality of AMSs.

According to another embodiment of the invention, the broadcasted information comprises unicast information intended for a specific AMS.

In accordance with another embodiment of the present invention, at least one of the copies is transmitted for each of a third plurality of AMSs selected from among the second plurality of AMSs, and wherein each of the AMSs belonging to the third plurality of AMSs is capable of decoding messages at the same decoding rate as the other AMSs belonging to the same third plurality of AMSs. Preferably, the coding of messages' copies to be transmitted to the third plurality of AMSs is carried out under more robust conditions than that which is used for coding the messages transmitted to the remaining AMSs of the second plurality of AMSs.

By still another preferred embodiment of the invention, each of the second plurality of AMSs is adapted to make an attempt to decode at least one of the BR-ACK MAP-IE messages comprised in a DL frame received after the respective AMS has transmitted its bandwidth request indication.

According to another aspect of the invention, there is provided an Advanced Base Station (ABS) operative in wireless network which comprises a plurality of Advanced Mobile Stations (AMSs) and adapted to transmit a communication frame which comprises aggregated multi unicast information within broadcasted information intended for a second plurality of AMSs, wherein said information is broadcasted by using more than one Modulation and Coding Scheme (MCS). The ABS comprises:

(i) receiving means adapted to receive bandwidth requests' indications from the second plurality of AMSs belonging to the first plurality of AMSs;

(ii) a processor adapted to identify, based on the indications, more than one decoding capabilities, wherein each of the identified decoding capabilities is associated with at least one AMS belonging to the second plurality of AMSs and to prepare one or more Bandwidth Request Acknowledgement Media Access Protocol Information Element (BR-ACK MAP-IE) messages, in response to the bandwidth requests' indications received; and (iii) transmission means adapted to transmit towards the second plurality of AMSs, a communication frame which comprises at least two copies of the BR-ACK MAP-IE message, wherein the number of the at least two copies corresponds to the number of different decoding capabilities identified, and wherein each of the at least two copies is transmitted at an MCS that corresponds to a respective decoding capability that has been identified.

As was previously indicated, it should be appreciated by those skilled in the art that one BR-ACK MAP-IE message may be transmitted even though there are AMSs having different encoding capabilities due to the load created by BR-ACK MAP-IE message's header overheads. In accordance with another embodiment, the transmission means is further adapted to transmit broadcast messages comprising unicast information intended to a specific AMS.

By yet another embodiment, at least one of the copies is transmitted for each of a third plurality of AMSs selected from among said second plurality of AMSs, and wherein each of the third plurality of AMSs is capable of decoding messages at the same decoding rate as the other AMSs belonging to that third plurality of AMSs. Preferably, the coding of the messages' copies transmitted to each of the third plurality of AMSs is carried out under more robust conditions than that which is used for coding the messages transmitted to the remaining AMSs of the second plurality of AMSs.

BRIEF DESCRIPTION OF THE DRAWINGS

A better understanding of the present invention may be obtained when the following non-limiting detailed description is considered in conjunction with the accompanying figures.

DETAILED DESCRIPTION OF THE INVENTION

Figure 1:
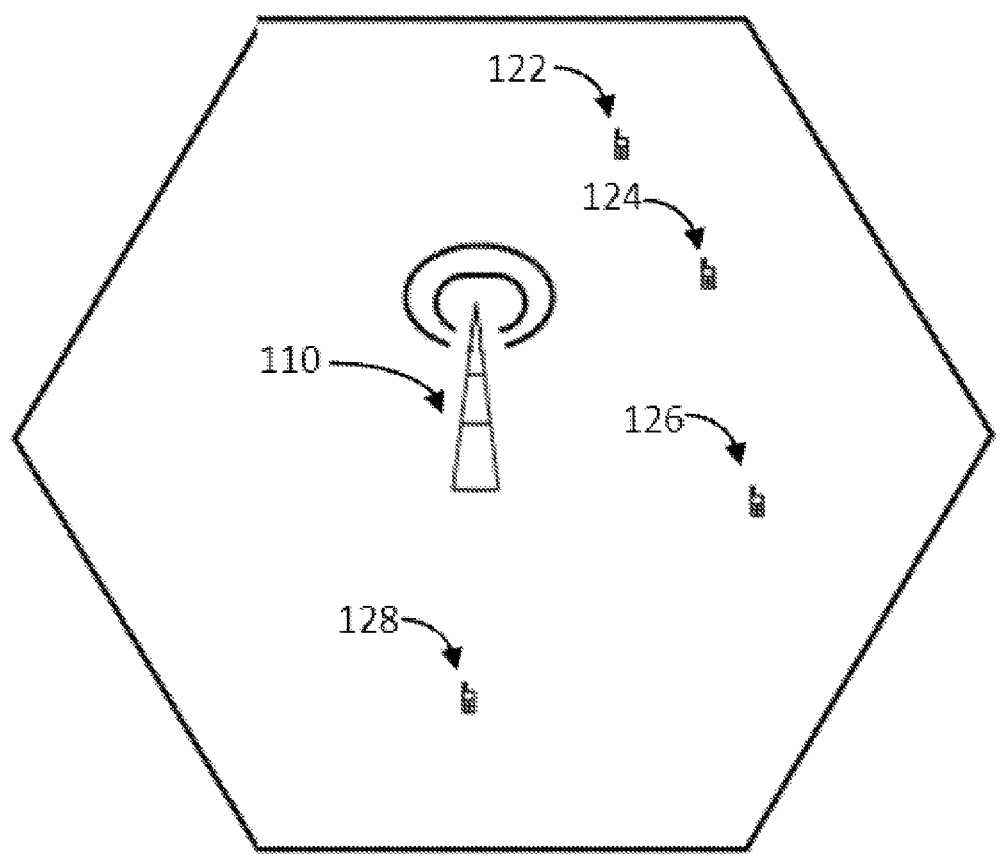
FIG. 1—describes an example of a cell in a network where the Advanced Base Station (ABS) broadcast messages comprise aggregated multi unicast information to multiple users.

One example of implementing the present invention is available in contribution C80216m-09_2684r5 which was conceived and submitted by the inventor of the present invention. FIG. 1 is an example of a cell in a network according to the present invention where the ABS (110) broadcasting messages comprise aggregated multi unicast information destined to a plurality of AMSs (122, 124, 126 and 128). Typically, these AMSs are not identical to each other, and consequently not all of the AMSs operate under the same MCS. Let us assume that AMS 122 is operative to decode the message at the lowest decoding rate, while AMSs 124 and 126 may decode it at a higher decoding rate, whereas AMS 128 may decode it at the highest decoding rate that is still supported by the serving ABS (e.g. ABS). According to prior art solutions, in order to broadcast such a message that should be decoded by all of these AMSs, the ABS has to transmit it at the lowest operative MCS, which in our example is the decoding rate associated with AMS 122 decoding capabilities. As not all AMSs have the same decoding rate capabilities, and in fact in our example all of the other AMSs have higher MCS capabilities than AMS 122, by applying the lowest MCS which is known to be available for all addressed users, the ABS forces de facto AMSs 124, 126 and 128 to operate under a lower decoding rate than they are capable of. This restriction is very limiting and inefficient especially for the AMSs having the highest decoding rate capabilities such as AMS 128. Thus, according to the present solution, ABS 110 is adapted to transmit messages in several A-MAP IEs rather than in a single A-MAP IE. Preferably, the ABS will group users' information in several A-MAP IEs, each such group will contain information intended for AMSs located within the ABS coverage area, that have similar decoding capabilities of the AMSs. Thus, in the example of FIG. 1 three MCSs will be used. However, it should be noted that the ABS may decide on a different number of BR ACK IE messages based upon one or more additional considerations, e.g. due to the load imposed by the IE messages' header overheads. The first is the one that fits the decoding capability of AMS 122, the second fits the decoding rate associated with AMSs 124 and 126, and the last one, according to the decoding capability of AMS 128. In addition, according to an embodiment of the present invention, the ABS is able to control the A-MAP IE size, so that it will not exceed a pre-defined size, e.g. an integer number of MLRUs size, MLRU [Map Logical Resource Unit] being the minimum logical resource unit in the assignment A-MAP consisting of [$N_{MLRU}$=48] data tones.

Figure 2A:
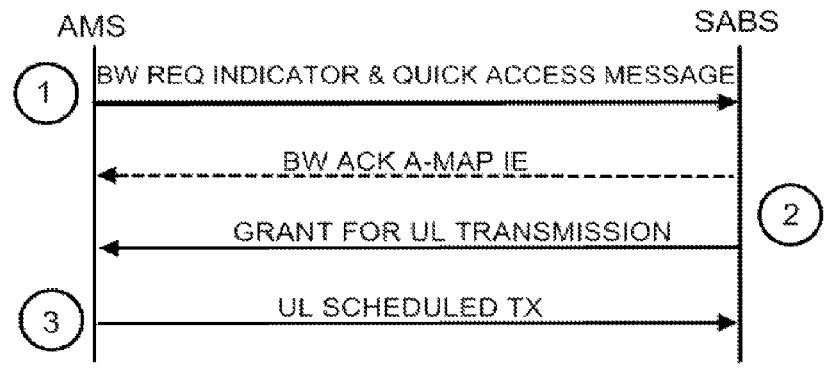
FIG. 2A—illustrates a prior art 3-step random access Bandwidth Request (BR) procedure as appears in the IEEE 802.16m Standard.

FIG. 2A illustrates a 3-step random access based BR procedure that has been adopted by the IEEE 802.16m standardization committee. At step 1, the AMSs transmit BR indicators (a preamble sequence) as quick access messages on randomly selected opportunities (e.g. selected slot within the bandwidth request channel) to the ABS. At step 2, the ABS responds by transmitting explicit acknowledgement (BR-ACK A-MAP IE) to the AMSs, indicating in the next DL frame the results obtained while decoding the BR indicators. At the third step, the AMSs start to transmit according to schedule. As previously explained, the problem associated with the prior art solution provided by the Standard, is, that it is not adapted to deal with a large plurality of AMSs having different decoding capabilities while sending a single BR-ACK A-MAP IE message to all of the AMSs, as the BR-ACK A-MAP IE needs to be coded at the lowest common MCS of all AMSs, thus inevitably impacting the AMSs adapted to operate at a higher MCS.

Figure 2B:
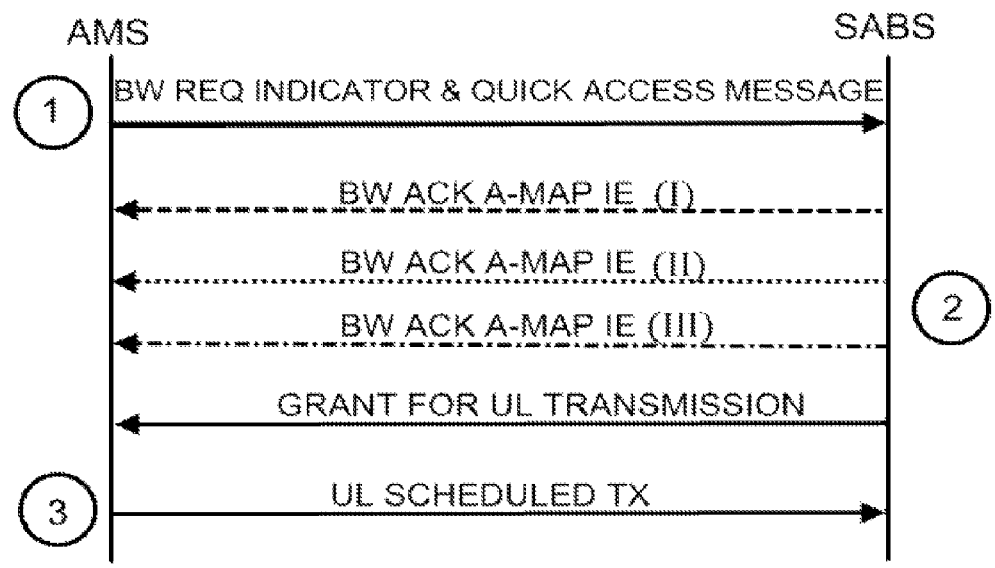
FIG. 2B—illustrates a 3-step random access Bandwidth Request (BR) procedure wherein all BR-ACK MAP IEs are sent at the same air frame, according to the present invention.

FIG. 2B illustrates a 3-step random access based BR procedure in accordance with the present invention. In step 1, the AMSs transmit BR indicators (respective preamble sequences) on randomly selected opportunities to the ABS. Then, a number of BR-ACK A-MAP IEs will be sent at the next DL frame, if the ABS detects BR preamble sequences at the BR opportunities of the preceding frame (step 2). The ABS sends multiple (in the present example three) BR-ACK A-MAP IEs, where each BR-ACK A-MAP IE contains its own bitmap relating to the BR indicator being acknowledged/granted in this message alone, or in the alternative, to the BR indicators associated with AMSs that are operative under the same MCS. Each AMS upon decoding the best suited BR-ACK MAP-IE in the next DL will start transmitting according to schedule provided. In the case where no BR-ACK A-MAP IEs are sent at the next DL frame, the AMS considers it as an implicit-NACK and may in return restart the BR procedure. Each BR-ACK A-MAP IE contains its own bitmap relating only to the preamble indices being acknowledged/granted in this message.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. In a wireless network comprising at least one Base Station adapted to communicate with a first plurality of Mobile Stations, a method for transmitting a communication frame which comprises aggregated multi unicast information within broadcasted information intended for a second plurality of Mobile Stations, wherein said information is broadcasted by using more than one Modulation and Coding Scheme (MCS), said method comprises the steps of:
  a. at said Base Station, receiving indications of bandwidth requests generated by said second plurality of Mobile Stations, said second plurality of Mobile Stations belonging to the first plurality of Mobile Stations;
  b. identifying more than one decoding capabilities, wherein each of the identified decoding capabilities is associated with at least one Mobile Station belonging to said second plurality of Mobile Stations;
  c. preparing more than one bandwidth request acknowledgement messages in response to said indications of bandwidth requests received; and
  d. transmitting towards said second plurality of Mobile Stations, a communication frame comprising the more than one bandwidth request acknowledgement messages, wherein the number of the more than one bandwidth request acknowledgement messages corresponds to the number of different decoding capabilities identified, and wherein each of the more than one bandwidth request acknowledgement messages is transmitted at an MCS that corresponds to a respective decoding capability that has been identified, and wherein at least one of the bandwidth request acknowledgement messages is transmitted for each of a third plurality of Mobile Stations selected from among said second plurality of Mobile Stations, and wherein each of said third plurality of Mobile Stations is capable of decoding messages at the same decoding rate as the other Mobile Stations belonging to said third plurality of Mobile Stations.

2. The method according to claim 1, wherein said broadcasted information comprises unicast information intended for a specific Mobile Station.

3. The method according to claim 1, wherein each of the second plurality of Mobile Stations is adapted to make an attempt to decode at least one of the bandwidth request acknowledgement messages comprised in a DL frame received after the respective Mobile Station has transmitted its bandwidth request indication.

4. The method according to claim 1, wherein the bandwidth request acknowledgement is a Bandwidth Request Acknowledgement Media Access Protocol Information Element (BR-ACK MAP-IE).

5. A method for transmitting a communication frame in a wireless network, wherein the information is broadcasted by using more than one modulation and coding scheme (MCS), the method comprising:
  at a base station adapted to communicate with a first plurality of mobile stations, receiving indications of bandwidth requests generated by a first mobile station, a second mobile station, and a third mobile station;
  identifying a first decoding capability which corresponds to a first MCS and is associated with at least the first mobile station;

identifying a second decoding capability which corresponds to a second MCS and is associated with at least the second mobile station and the third mobile station;

preparing a first bandwidth request acknowledgement message in response to the bandwidth request indications received from the first mobile station;

preparing a second bandwidth request acknowledgement message in response to the bandwidth request indications received from the second mobile station;

preparing a third bandwidth request acknowledgement message in response to the bandwidth request indications received from the third mobile station; and transmitting towards the first plurality of mobile stations, a communication frame which comprises aggregated multi unicast information within broadcasted information including the first bandwidth request acknowledgement message using the first MCS, the second bandwidth request acknowledgement message using the second MCS, and the third bandwidth request acknowledgment message also using the second MCS.

6. The method of claim 5 wherein the first bandwidth request acknowledgment message includes a bandwidth grant for the first mobile station.

7. The method of claim 6 wherein the frame further comprises aggregated multiple unicast information for a specific AMS.

8. The method of claim 5 wherein the first bandwidth request acknowledgment message is a Bandwidth Request Acknowledgement Media Access Protocol Information Element (BR-ACK MAP-IE).

9. A method of operating a base station (BS) in a wireless network which comprises a first plurality of mobile stations (MSs), wherein said information is broadcasted by using more than one modulation and coding scheme, comprising:

receiving bandwidth request indicators from a second plurality of MSs, the second plurality of AMSs being a subset of the first plurality of MSs;

preparing a plurality of bandwidth request acknowledgements in response to said bandwidth requests indicators received; and transmitting to said second plurality of MSs, a communication frame which comprises aggregated multi unicast information within broadcasted information intended for the second plurality of MSs, the communication frame including the plurality of bandwidth request acknowledgements, wherein at least one of the plurality of bandwidth request acknowledgements is transmitted with a modulation and coding scheme which is different from the modulation and coding scheme which is used to transmit at least one other of the plurality of bandwidth request acknowledgements.

10. The method of claim 9 wherein at least one of the plurality of bandwidth request acknowledgments includes a bandwidth grant for a mobile station.

11. The method of claim 9 wherein the plurality of bandwidth request acknowledgments are Bandwidth Request Acknowledgement Media Access Protocol Information Element (BR-ACK MAP-IE).

* * * * *